(12) United States Patent
Kim et al.

(10) Patent No.: US 11,341,653 B2
(45) Date of Patent: May 24, 2022

(54) APPARATUS AND METHOD FOR TRAINING MODEL FOR IMAGE SEGMENTATION

(71) Applicant: SAMSUNG SDS CO., LTD., Seoul (KR)

(72) Inventors: Ji Hoon Kim, Seoul (KR); Seung Ho Shin, Seoul (KR); Se Won Woo, Seoul (KR)

(73) Assignee: SAMSUNG SDS CO., LTD., Seoul (KR)

(*) Notice: Subject to any disclaimer, the term of this patent is extended or adjusted under 35 U.S.C. 154(b) by 70 days.

(21) Appl. No.: 16/884,981

(22) Filed: May 27, 2020

(65) Prior Publication Data
US 2021/0366128 A1 Nov. 25, 2021

(30) Foreign Application Priority Data
May 22, 2020 (KR) .................. 10-2020-0061438

(51) Int. Cl.
G06T 7/194 (2017.01)
G06K 9/62 (2022.01)
G06T 5/00 (2006.01)
G06T 7/143 (2017.01)
G06V 10/26 (2022.01)

(52) U.S. Cl.
CPC ............ *G06T 7/194* (2017.01); *G06K 9/6256* (2013.01); *G06T 5/004* (2013.01); *G06T 7/143* (2017.01); *G06V 10/267* (2022.01)

(58) Field of Classification Search
CPC ... G06T 7/10–194; G06T 5/004; G06T 7/194; G06T 7/143; G06K 9/342; G06K 9/6256–6259; G06V 10/267
See application file for complete search history.

(56) References Cited

U.S. PATENT DOCUMENTS

2018/0189951 A1* 7/2018 Liston ..................... G06T 11/00
2020/0202168 A1* 6/2020 Mao ..................... G06K 9/6857

FOREIGN PATENT DOCUMENTS

KR  10-2017-0034226 A  3/2017

OTHER PUBLICATIONS

Bellver et al, "Budget-aware Semi-Supervised Semantic and Instance Segmentation" (published in Computer Vision and Pattern Recognition, pp. 93-102, Jun. 2019) (Year: 2019).*

* cited by examiner

*Primary Examiner* — Casey L Kretzer
(74) *Attorney, Agent, or Firm* — The PL Law Group, PLLC

(57) ABSTRACT

An image segmentation model training apparatus according to a disclosed embodiment includes a predictor, which generates a plurality of original masks using an unlabeled original image set and a pre-trained image segmentation model, a label generator, which generates a synthesized image set based on the original image set and the plurality of original masks, and generates a plurality of pseudo labels based on the synthesized image set, a pre-processor, which generates a training image set by performing pseudo labeling on the original image set and the synthesized image set using the plurality of pseudo labels, and a model trainer, which further trains the image segmentation model based on the training image set.

15 Claims, 10 Drawing Sheets

FIG. 2
(a)
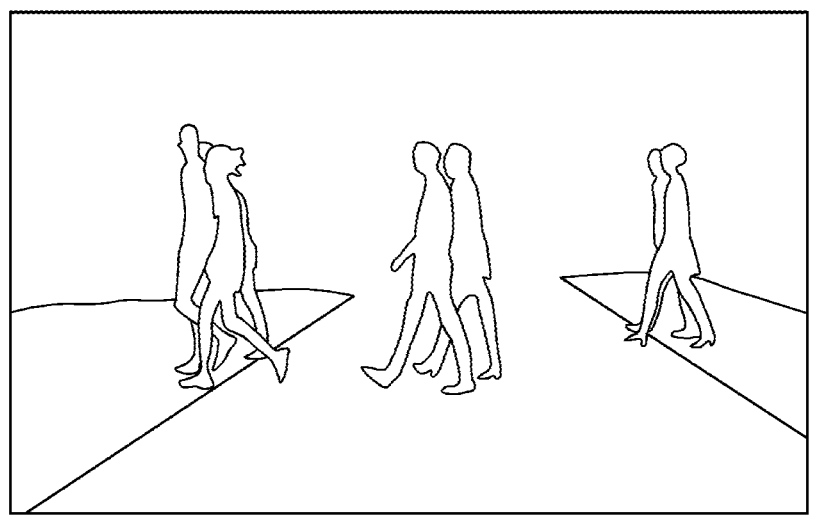
(b)

APPARATUS AND METHOD FOR TRAINING MODEL FOR IMAGE SEGMENTATION

CROSS REFERENCE TO RELATED APPLICATIONS AND CLAIM OF PRIORITY

This application claims the benefit of Korean Patent Application No. 10-2020-0061438 filed on May 22, 2020 in the Korean Intellectual Property Office, the disclosure of which is incorporated herein by reference in its entirety.

TECHNICAL FIELD

Embodiments disclosed herein relate to a technology of training a model for image segmentation.

BACKGROUND ART OF THE INVENTION

Recently, the area of a computer vision technology has extended to image segmentation for predicting labels of all pixels in an image beyond simple classification of an image and detection of a detailed configuration included in an image.

Here, a pre-trained model is used to perform image segmentation, and a model is required to be trained a larger number of times to provide a more accurate prediction result to a user, and, during this process, a large amount of pre-labeled data is required.

However, actually present data includes a larger number of pieces of unlabeled data, and it requires excessive cost and time to label each of such pieces of data in order to train a model.

Therefore, it is necessary to construct a structure for autonomously training a model using unlabeled data in order to implement an advanced image segmentation technology.

SUMMARY

Disclosed embodiments are for training a model for image segmentation.

An image segmentation model training apparatus according to an embodiment includes a predictor, which generates a plurality of original masks using an unlabeled original image set and a pre-trained image segmentation model, a label generator, which generates a synthesized image set based on the original image set and the plurality of original masks, and generates a plurality of pseudo labels based on the synthesized image set, a pre-processor, which generates a training image set by performing pseudo labeling on the original image set and the synthesized image set using the plurality of pseudo labels, and a model trainer, which further trains the image segmentation model based on the training image set.

The label generator may include a mask generator, which generates a plurality of modified masks based on at least one of the plurality of original masks, a synthesizer, which generates the synthesized image set based on the original image set and the plurality of modified masks, an estimator, which estimates a probability that each of synthesized images included in the synthesized image set is determined as an image included in the original image set, and a determinator, which determines, as the pseudo label, boundary information about a mask used to generate a synthesized image for which the probability is above a preset value among the plurality of modified masks.

The mask generator may generate the plurality of modified masks by modifying the boundary information of at least one of the plurality of original masks.

The label generator may further include an agent, which generates a matching pair of at least a portion of images included in the original image set and the plurality of modified masks and a synthesis parameter for generating the synthesized images, and the synthesizer may generate the synthesized image set based on the matching pair and the synthesis parameter.

The pre-processor may generate a first training image set by performing the pseudo labeling on the original image set using the plurality of pseudo labels, and may generate a second training image set by performing the pseudo labeling on the synthesized image set using the plurality of pseudo labels.

The pre-processor may perform the pseudo labeling on the original image set by displaying the boundary information corresponding to one of the plurality of pseudo labels on at least one original image included in the original image set, and may perform the pseudo labeling on the synthesized image set by displaying the boundary information corresponding to one of the plurality of pseudo labels on at least one synthesized image included in the synthesized image set.

The image segmentation model training apparatus according to another embodiment may further include a training completer, which completes training of the image segmentation model when a number of the plurality of pseudo labels generated is above a preset value.

An image segmentation model training method according to an embodiment, which is performed in a computing device including one or more processors and a memory storing one or more programs executed by the one or more processors, includes generating a plurality of original masks using an unlabeled original image set and a pre-trained image segmentation model, generating a synthesized image set based on the original image set and the plurality of original masks, generating a plurality of pseudo labels based on the synthesized image set, generating a training image set by performing pseudo labeling on the original image set and the synthesized image set using the plurality of pseudo labels, and further training the image segmentation model based on the training image set.

The generating of the synthesized image set may include generating a plurality of modified masks based on at least one of the plurality of original masks and generating the synthesized image set based on the original image set and the plurality of modified masks.

The generating of the plurality of pseudo labels may include estimating a probability that each of synthesized images included in the synthesized image set is determined as an image included in the original image set, and determining, as the pseudo label, boundary information about a mask used to generate a synthesized image for which the probability is above a preset value among the plurality of modified masks.

The generating of the plurality of modified masks may include generating the plurality of modified masks by modifying the boundary information of at least one of the plurality of original masks.

The generating of the plurality of pseudo labels may further include generating a matching pair of at least a portion of images included in the original image set and the plurality of modified masks and a synthesis parameter for generating the synthesized images, and the generating of the synthesized image set include generating the synthesized image set based on the matching pair and the synthesis parameter.

The generating of the training image set may include generating a first training image set by performing the pseudo labeling on the original image set using the plurality of pseudo labels, and generating a second training image set by performing the pseudo labeling on the synthesized image set using the plurality of pseudo labels.

The generating of the training image set may include performing the pseudo labeling on the original image set by displaying the boundary information corresponding to one of the plurality of pseudo labels on at least one original image included in the original image set, and performing the pseudo labeling on the synthesized image set by displaying the boundary information corresponding to one of the plurality of pseudo labels on at least one synthesized image included in the synthesized image set.

The image segmentation model training method may further include completing training of the image segmentation model when the number of a plurality of pseudo labels generated is above a preset value.

According to disclosed embodiments, the cost and time required for data labeling can be effectively reduced by autonomously generating a pseudo label using an unlabeled image set.

Furthermore, according to disclosed embodiments, pseudo labeling is performed on both an existing image set and a synthesized image set using a generated pseudo label, and thus a larger amount of training data can be obtained compared to the case in which pseudo labeling is performed only on an existing image set.

BRIEF DESCRIPTION OF THE DRAWINGS

FIG. 2 is an exemplary diagram for describing and comparing original data and an original mask according to an embodiment.

DETAILED DESCRIPTION

Hereinafter, specific embodiments will be described with reference to the drawings. The following detailed description is provided to assist in a comprehensive understanding of the methods, devices and/or systems described herein. However, those are merely exemplary, and embodiments are not limited thereto.

In describing embodiments, detailed descriptions of related well-known technology will not be provided in order not to unnecessarily obscure the gist of the embodiments. The terms used herein are defined in consideration of the functions of the disclosed embodiments, but may be changed depending on the customary practice or the intention of a user or operator. Thus, the definitions should be determined based on the overall content of the present disclosure. The terms used herein are only for describing the embodiments, and should not be construed as limitative. Unless expressly used otherwise, a singular form includes a plural form. In the present disclosure, the terms "include", "have", comprise", and the like are used to indicate certain characteristics, numbers, steps, operations, and a portion or combination thereof, but should not be interpreted to preclude one or more other characteristics, numbers, steps, operations, and a portion or combination thereof.

In the following embodiments, the term "image segmentation" refers to a specific field of a computer vision field in which labels of all pixels included in an image are predicted and classified into a pre-specified number of classes.

Figure 1:
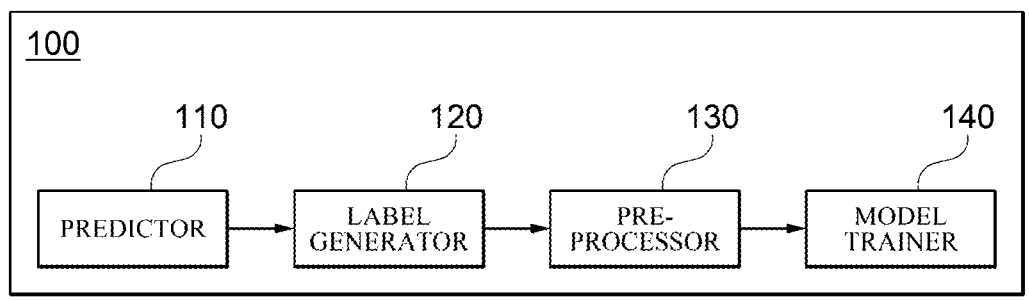
FIG. 1 is a block diagram illustrating an image segmentation model training apparatus according to an embodiment.

FIG. 1 is a block diagram illustrating an image segmentation model training apparatus 100 according to an embodiment.

Referring to FIG. 1, the image segmentation model training apparatus 100 according to an embodiment includes a predictor 110, a label generator 120, a pre-processor 130, and a model trainer 140.

The predictor 110 generates a plurality of original masks using an unlabeled original image set and a pre-trained image segmentation model.

Hereinafter, the term "mask" refers to both information about a boundary constituting a portion of an image and information about an image within the boundary.

According to an embodiment, an image segmentation model may include a convolutional neural network (CNN) structure and a plurality of fully-connected layers.

In detail, the image segmentation model may include a mask R-CNN structure.

The label generator 120 generates a synthesized image set based on the original image set and the plurality of original masks, and generates a plurality of pseudo labels based on the synthesized image set.

According to an embodiment, the term "pseudo label" may represent a label autonomously generated by the image segmentation model training apparatus 100 so as to be used as an input to an image segmentation model so that the image segmentation model may identify images in the original image set or images in a synthesized image set.

The pre-processor 130 generates a training image set by performing pseudo modeling on the original image set and the synthesized image set using the plurality of pseudo labels. Hereinafter, the term "pseudo labeling" refers to labeling at least a portion of images in the original image set or at least a portion of images in the synthesized image set with pseudo labels.

According to an embodiment, the pre-processor 130 may generate a first training image set by performing the pseudo labeling on the original image set using the plurality of pseudo labels generated by the label generator 120.

In detail, the pre-processor 130 may generate the first training image set by performing the pseudo labeling on the original image set by displaying boundary information corresponding to one of the plurality of pseudo labels on at least one original image included in the original image set.

Hereinafter, the term "boundary information" may be two-dimensional space coordinate values specifying vertices or lines forming a boundary of an original mask.

Furthermore, according to an embodiment, the pre-processor 130 may generate a second training image set by performing the pseudo labeling on the synthesized image set using the plurality of pseudo labels generated by the label generator 120.

In detail, the pre-processor 130 may generate the second training image set by performing the pseudo labeling on the synthesized image set by displaying boundary information corresponding to one of the plurality of pseudo labels on at least one synthesized image included in the synthesized image set.

The model trainer 140 further trains the image segmentation model based on the training image set.

According to an embodiment, since the training image set includes the pseudo-labeled first training image set and the pseudo-labeled second training image set, the model trainer 140 may train the image segmentation model using various training methods that are applied to supervised learning.

Furthermore, according to an additional embodiment, the image segmentation model training apparatus 100 may further include a training completer (not shown) in addition to the predictor 110, the label generator 120, the pre-processor 130, and the model trainer 140.

Here, the training completer (not shown) may complete training of the image segmentation model when the number of the plurality of pseudo labels generated by the label generator 120 is at least the number of the images included in the original image set.

That is, in other words, when the number of the plurality of pseudo labels is at least the number of the images included in the original image set, the training completer (not shown) may determine that at least one pseudo label has been matched to each of the images included in the original image set, and may complete training of the image segmentation model.

FIG. 2 is an exemplary diagram for describing and comparing original data and an original mask according to an embodiment. (a) of FIG. 2 is a diagram illustrating original data according to an embodiment, and (b) of FIG. 2 is a diagram illustrating boundary information in an original mask generated based on the original data according to an embodiment.

Referring to (a) of FIG. 2, a waiting vehicle is shown at the bottom of the image, and several persons who are crossing a road in front of the vehicle are shown in the center of the image. Sidewalks having different color from that of the road are shown on the sides of the road, and objects such as trees and buildings are shown on the background.

Here, it is assumed that the image segmentation model training apparatus 100 according to an embodiment uses an image segmentation model for performing image segmentation by recognizing the persons and sidewalks shown in (a) of FIG. 2.

In this case, the image segmentation model training apparatus 100 may use the above-described image segmentation model to generate an original mask including boundary information about each of the persons and sidewalks shown in (a) of FIG. 2 and image information within a boundary.

Next, (b) of FIG. 2 exemplarily illustrates the boundary information included in the original mask generated as described above, and more specifically, illustrates the boundary information about the sidewalks on the sides of the road and some of the persons shown in (a) of FIG. 2.

According to an embodiment, the image segmentation model training apparatus 100 may generate a plurality of pieces of modified boundary information by modifying the boundary information shown in (b) of FIG. 2, and may generate a plurality of modified masks including the plurality of pieces of modified boundary information and image information within a modified boundary.

Figure 3:
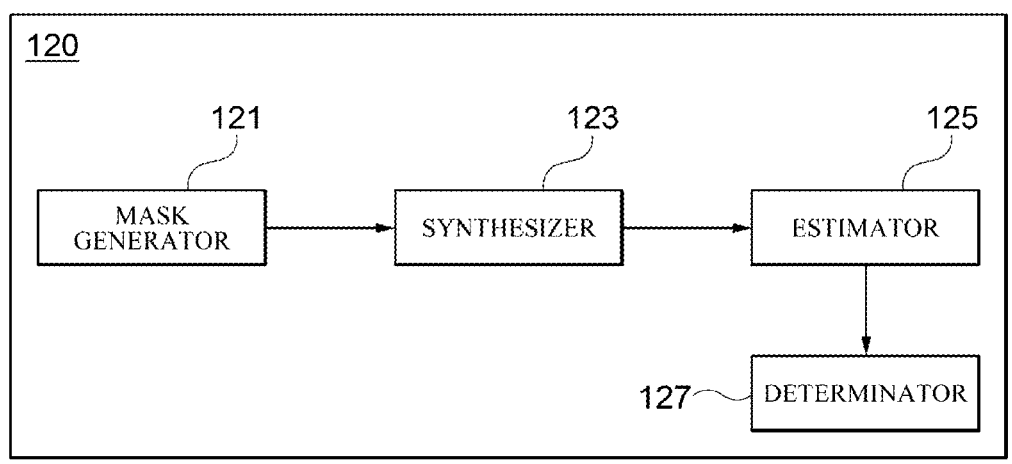
FIG. 3 is a block diagram for describing a label generator in detail according to an embodiment.

FIG. 3 is a block diagram for describing the label generator 120 in detail according to an embodiment.

Referring to FIG. 3, the label generator 120 may include a mask generator 121, a synthesizer 123, an estimator 125, and a determinator 127.

The mask generator 121 may generate a plurality of modified masks based on at least one of the plurality of original masks.

According to an embodiment, the mask generator 121 may generate the plurality of modified masks by modifying boundary information of at least one of the plurality of original masks.

In detail, the mask generator 121 may generate the plurality of modified masks by changing two-dimensional space coordinate values specifying vertices or lines forming a boundary of at least one of the plurality of original masks.

For example, the mask generator 121 may generate the plurality of modified masks by arbitrarily selecting one of the vertices forming the boundary of at least one of the plurality of original masks and multiplying coordinates values specifying the corresponding vertex by a random number within a preset range. In this manner, the label generator 120 may generate various pseudo labels and a synthesized image set including various synthesized images, and, on the basis thereof, the image segmentation model training apparatus 100 may more effectively train the image segmentation model.

The synthesizer 123 may generate a synthesized image set based on the original image set and the plurality of modified masks.

According to an embodiment, the label generator 120 may further include an agent, which generates a matching pair of at least a portion of the images included in the original image set and the plurality of modified masks and a synthesis parameter for generating a synthesized image, and the synthesizer 123 may generate the synthesized image set based on the matching pair and the synthesis parameter generated by the agent.

In detail, the agent may generate a plurality of matching pairs by mapping at least a portion of the images included in the original image set and the plurality of modified masks, and may generate the synthesis parameter for synthesizing mapped matching pairs.

According to an embodiment, when there is an original image (hereinafter referred to as a "matching image") and a modified mask (hereinafter referred to as a "matching mask") included in the same matching pair, the synthesizer 123 may cut, from the matching image, an image located at a position corresponding to the matching mask, and then may concatenate the partially cut matching image with the matching mask so as to generate a synthesized image.

The estimator 125 may estimate a probability that each of synthesized images included in the synthesized image set will be determined as an image included in the original image set.

According to an embodiment, the estimator 125 may include an artificial neural network separated from the image segmentation model, and may be trained so as to distinguish whether each of images input to the estimator 125 is an image included in the original image set or an image included in the synthesized image set.

In detail, the estimator 125 may receive an input of the original image set and the synthesized image set, and may be trained so as to achieve an objective of estimating the probability as 1 when each of input images is an image included in the original image set and estimating the probability as 0 when each of input images is an image included in the synthesized image set. Here, a loss function used in the training may be, for example, a binary cross entropy function, but is not limited thereto.

The determinator 127 may determine, as a pseudo label, the boundary information about a mask used to generate a synthesized image for which the probability estimated by the estimator 125 is at least a predetermined value, among the plurality of modified masks.

Figure 4:
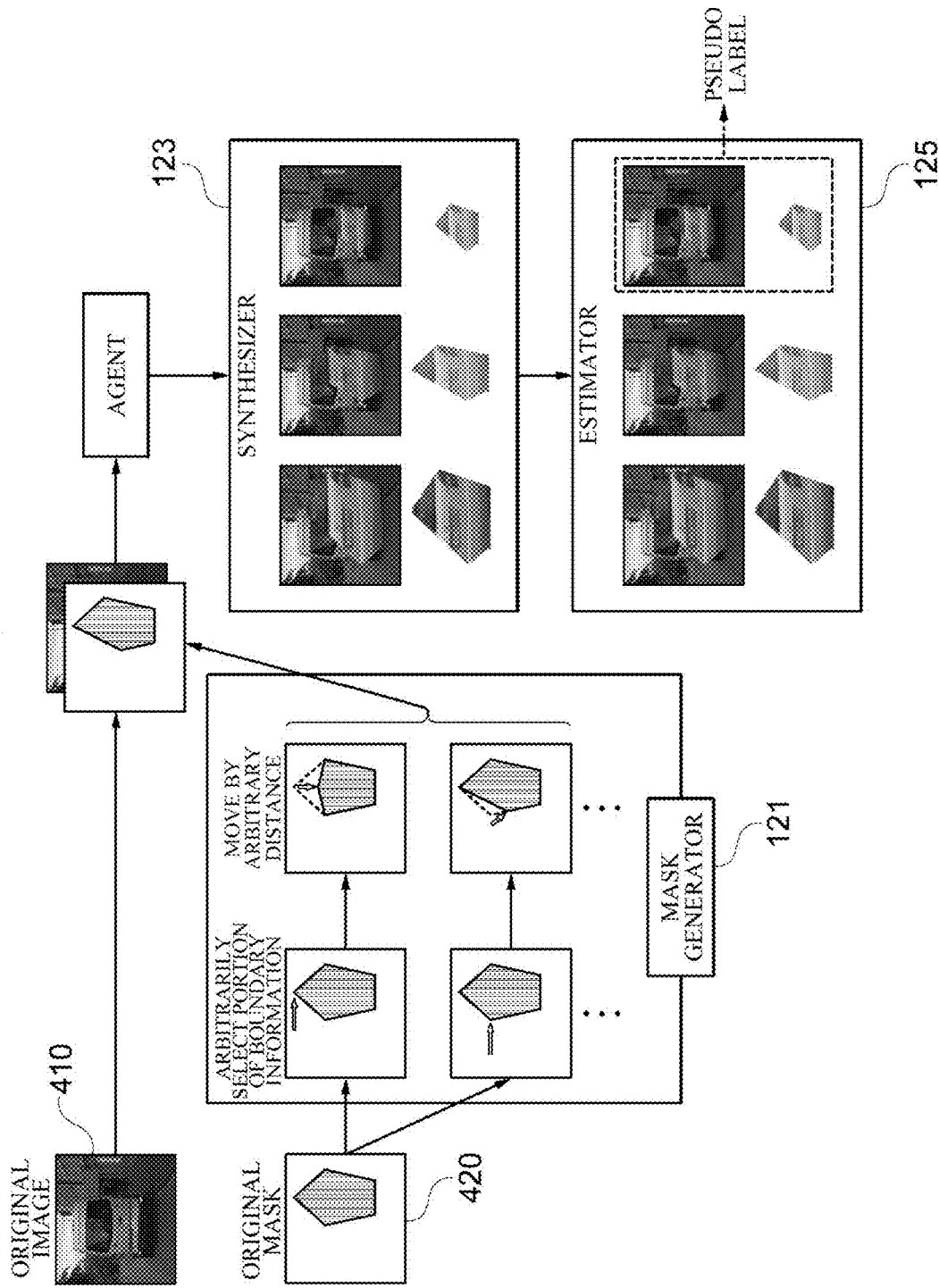
FIG. 4 is a diagram for describing an example of generating a pseudo label according to an embodiment.

FIG. 4 is a diagram for describing an example of generating a pseudo label according to an embodiment.

Referring to FIG. 4, the mask generator 121 may receive an input of a pentagonal original mask 420, may arbitrarily select one vertex that is a portion of boundary information, and may move the selected vertex by an arbitrary distance so as to generate a plurality of modified masks having various figure shapes.

Thereafter, the agent may receive an original image 410, in which an image of a rear of a vehicle is captured, and the plurality of modified masks generated by the mask generator 121 so as to generate a matching pair and a synthesis parameter.

Thereafter, the synthesizer 123 may generate, based on the matching pair and the synthesis parameter generated by the agent, a synthesized image set in which the plurality of modified masks having various figure shapes on the rear of the vehicle are synthesized.

Thereafter, the estimator 125 estimates the probability that each of synthesized images in the synthesized image set will be determined as an image in the original image set, and may select, as a pseudo label, the boundary information about a modified mask corresponding to the case in which the estimated probability is above a preset value.

For example, when the probability estimated for the rightmost synthesized image among the plurality of synthesized images illustrated in FIG. 4 is above the preset value, the estimator 125 may select, as a pseudo label, the boundary information about a modified mask used to generate the synthesized image.

Figure 5:
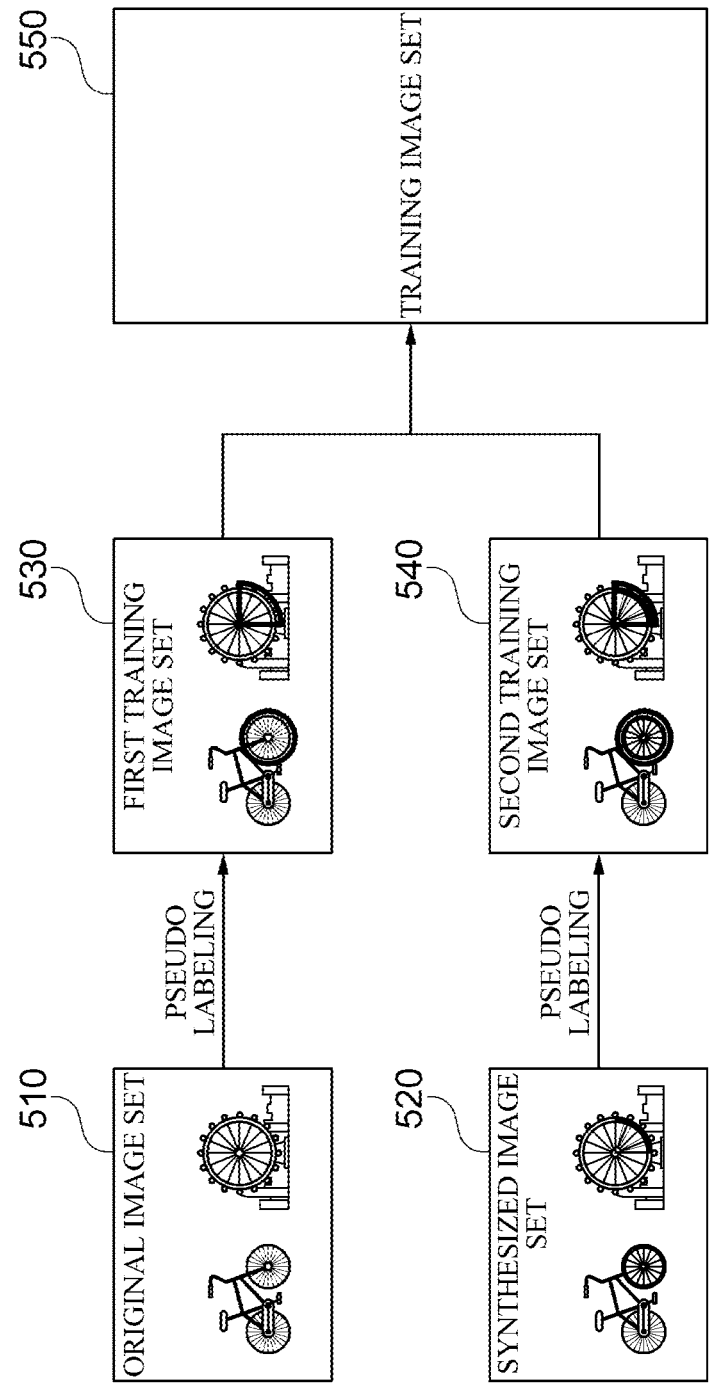
FIG. 5 is an exemplary diagram for describing a training image set according to an embodiment.

FIG. 5 is an exemplary diagram for describing a training image set 550 according to an embodiment.

The training image set illustrated in FIG. 5 may be generated by, for example, the above-described image segmentation model training apparatus 100.

Referring to FIG. 5, an original image set 510 includes, for example, an image representing a bicycle (hereinafter referred to as a "bicycle image") and an image representing a Ferris wheel (hereinafter referred to as a "Ferris wheel image").

Furthermore, a synthesized image set 520 includes, for example, a bicycle image in which a portion of the Ferris wheel image is synthesized (hereinafter referred to as a "synthesized bicycle image") and a Ferris wheel image in which a portion of the bicycle image is synthesized (hereinafter referred to as a "synthesized Ferris wheel image").

In detail, in the synthesized bicycle image, a partial image corresponding to a circular structure portion in the Ferris wheel image is synthesized in a front wheel portion of the bicycle image, and, in the synthesized Ferris wheel image, a partial image corresponding to a lower right portion of the front wheel in the bicycle image is synthesized in the circular structure portion of the Ferris wheel image.

Here, a pseudo label may include boundary information corresponding to the circular structure portion in the Ferris wheel image and boundary information corresponding to the lower right portion of the front wheel in the bicycle image.

Thereafter, the image segmentation model training apparatus 100 may perform pseudo labeling by displaying, on the bicycle image, the boundary information corresponding to the circular structure portion in the Ferris wheel image and displaying, on the Ferris wheel image, the boundary information corresponding to the lower right portion of the front wheel in the bicycle image, and, as a result, may generate a first training image set 530.

Likewise, the image segmentation model training apparatus 100 may perform pseudo labeling by displaying, on the synthesized bicycle image, the boundary information corresponding to the circular structure portion in the Ferris wheel image and displaying, on the synthesized Ferris wheel image, the boundary information corresponding to the lower right portion of the front wheel in the bicycle image, and, as a result, may generate a second training image set 540.

Thereafter, the image segmentation model training apparatus 100 may further train an image segmentation model based on the training image set 550 including the first training image set 530 and the second training image set 540.

Figure 6:
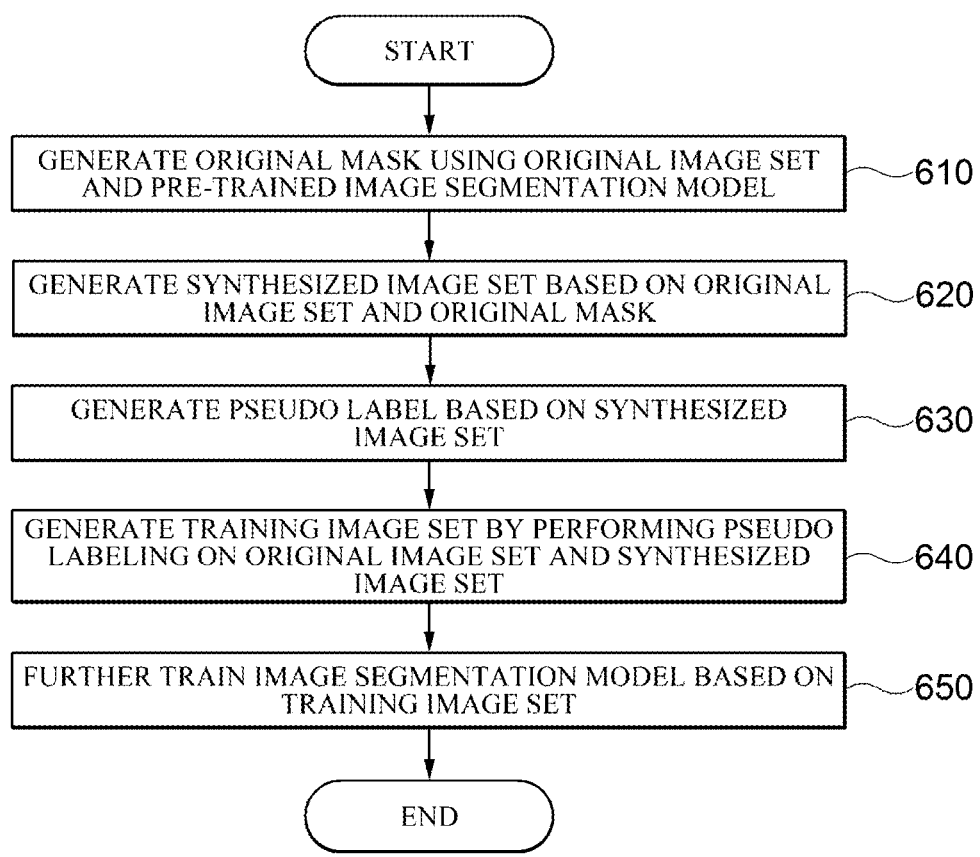
FIG. 6 is a flowchart illustrating an image segmentation model training method according to an embodiment.

FIG. 6 is a flowchart illustrating an image segmentation model training method according to an embodiment. The method illustrated in FIG. 6 may be performed by, for example, the above-described image segmentation model training apparatus 100.

In operation 610, the image segmentation model training apparatus 100 generates a plurality of original masks using an unlabeled original image set and a pre-trained image segmentation model.

In operation 620, the image segmentation model training apparatus 100 generates a synthesized image set based on the original image set and the plurality of original masks.

In operation 630, the image segmentation model training apparatus 100 generates a plurality of pseudo labels based on the synthesized image set.

In operation 640, the image segmentation model training apparatus 100 generates a training image set by performing pseudo modeling on the original image set and the synthesized image set using the plurality of pseudo labels.

In operation 650, the image segmentation model training apparatus 100 further trains the image segmentation model based on the training image set.

Figure 7:
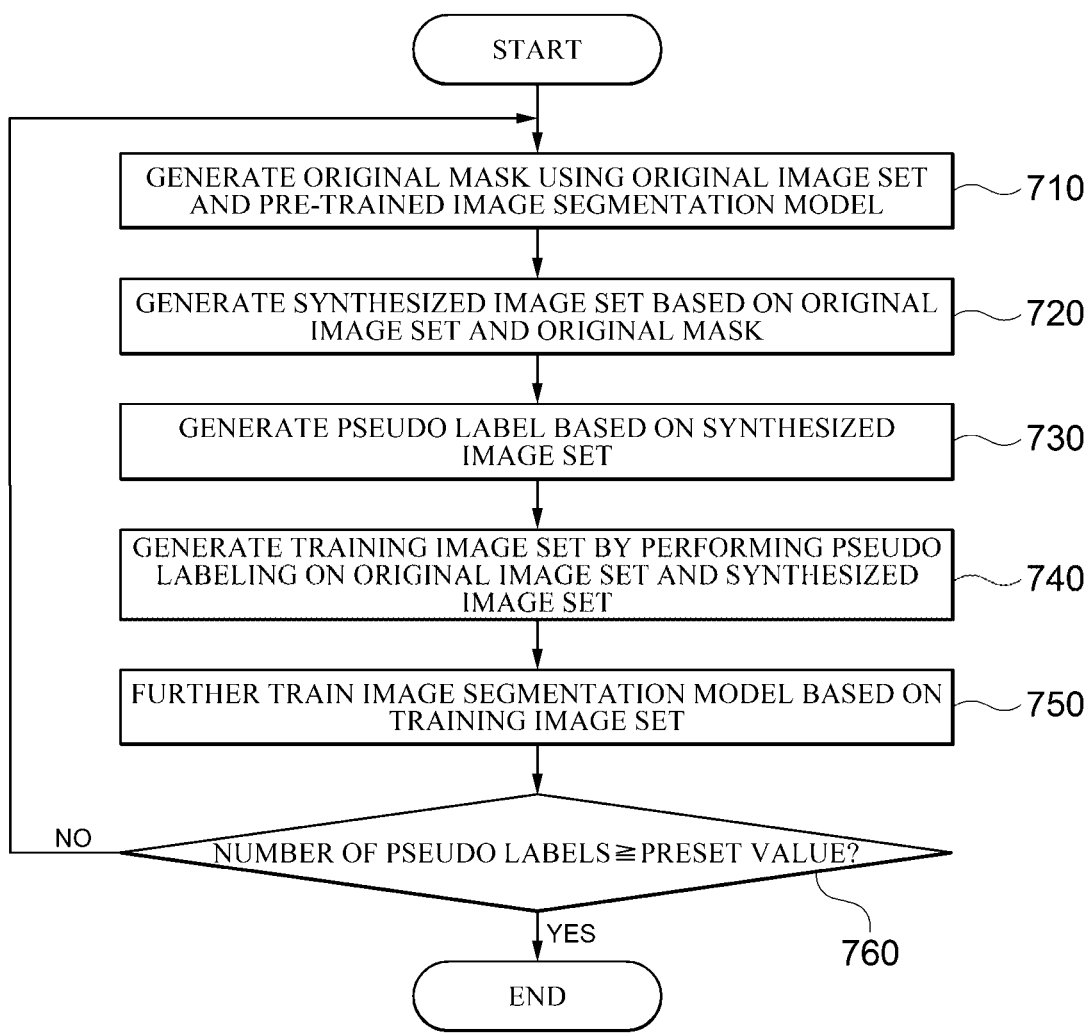
FIG. 7 is a flowchart illustrating an image segmentation model training method according to an additional embodiment.

FIG. 7 is a flowchart illustrating an image segmentation model training method according to an additional embodiment. The method illustrated in FIG. 7 may be performed by, for example, the above-described image segmentation model training apparatus 100.

Operations 710 to 750 correspond to operations 610 to 650 described above with reference to FIG. 6, and are thus not described in detail below.

When the number of the plurality of pseudo labels generated in operation 720 is above a preset value, the image segmentation model training apparatus 100 may complete training of the image segmentation model in operation 750.

According to an embodiment, the preset value may be a value set by a user before performing operation 750.

Figure 8:
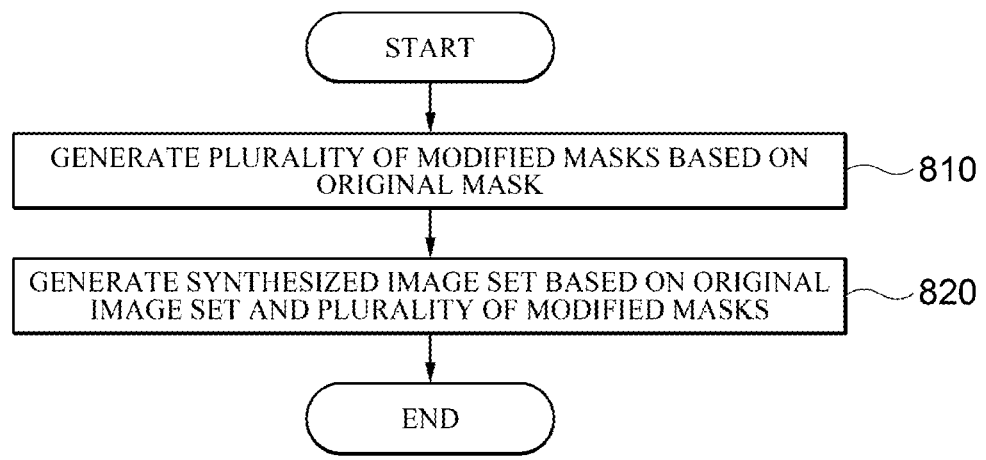
FIG. 8 is a flowchart for describing a step of generating a synthesized image set in detail according to an embodiment.

FIG. 8 is a flowchart for describing a step of generating a synthesized image set in detail according to an embodiment. The method illustrated in FIG. 8 may be performed by, for example, the above-described image segmentation model training apparatus 100.

In operation 810, the image segmentation model training apparatus 100 may generate a plurality of modified masks based on at least one of the plurality of original masks generated in operation 610 of FIG. 6 or operation 710 of FIG. 7.

In operation 820, the image segmentation model training apparatus 100 may generate the synthesized image set based on the original image set and the plurality of modified original masks.

Figure 9:
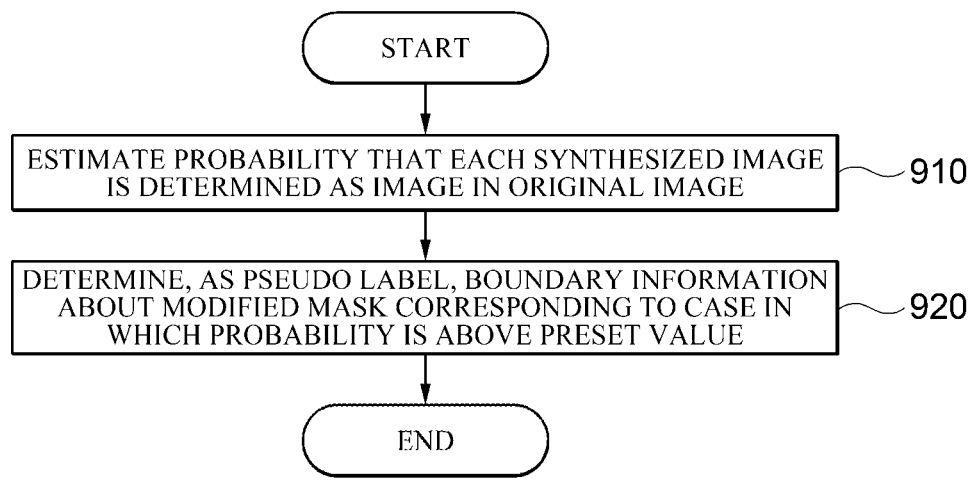
FIG. 9 is a flowchart for describing a step of generating a pseudo label in detail according to an embodiment.

FIG. 9 is a flowchart for describing a step of generating a pseudo label in detail according to an embodiment. The method illustrated in FIG. 9 may be performed by, for example, the above-described image segmentation model training apparatus 100.

In operation 910, the image segmentation model training apparatus 100 may estimate the probability that each of synthesized images included in the synthesized image set generated in operation 820 of FIG. 7 will be determined as an image included in the original image set.

In operation 920, the image segmentation model training apparatus 100 may determine, as a pseudo label, the boundary information about a mask used to generate a synthesized image for which the estimated probability is at least a predetermined value, among the plurality of modified masks.

Although the above methods are divided into a plurality of operations in the flowcharts illustrated in FIGS. 6 to 9, at least some of the operations may be performed by changing the order of the operations, may be performed in combination with other operations, may be skipped, may be divided into detailed operations, or may be performed by adding at least one operation which is not shown.

Figure 10:
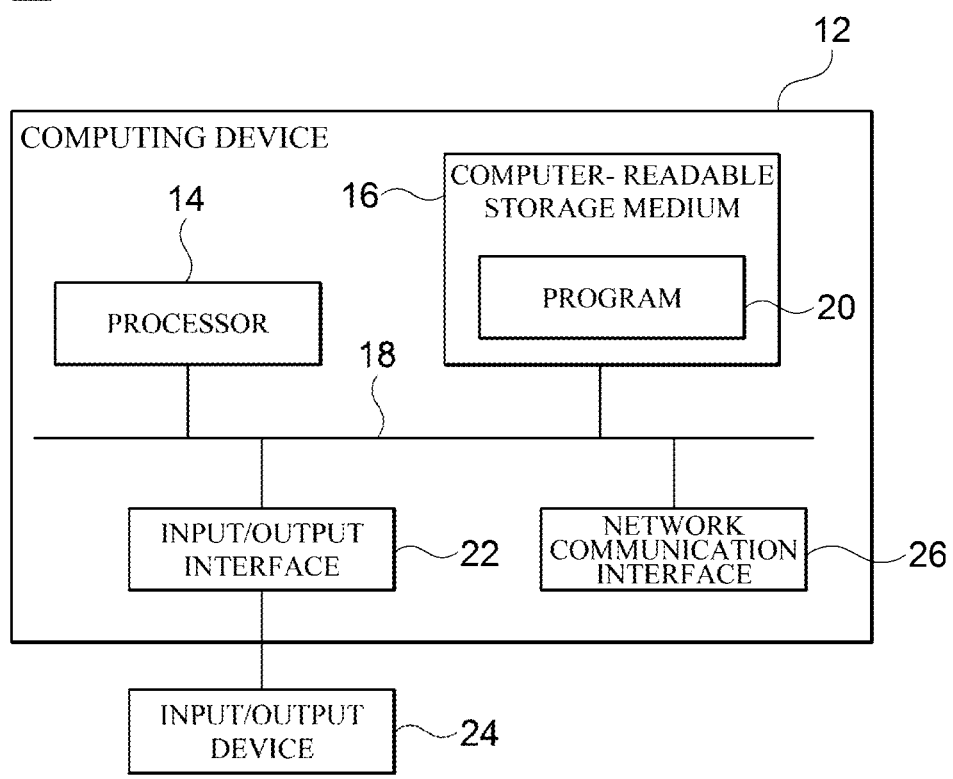
FIG. 10 is a block diagram for describing an example of a computing environment that includes a computing device suitable for use in exemplary embodiments.

FIG. 10 is a block diagram for describing an example of a computing environment 10 that includes a computing device suitable for use in exemplary embodiments. In the illustrated embodiment, each component may have different functions and capabilities in addition to those described below, and additional components may be included in addition to those described below.

The illustrated computing environment 10 includes a computing device 12. In an embodiment, the computing device 12 may be the image segmentation model training apparatus 100.

The computing device 12 includes at least one processor 14, a computer-readable storage medium 16, and a communication bus 18. The processor 14 may cause the computing device 12 to operate according to the above-described exemplary embodiments. For example, the processor 14 may execute one or more programs stored in the computer-readable storage medium 16. The one or more programs may include one or more computer-executable instructions, which may be configured to cause, when executed by the processor 14, the computing device 12 to perform operations according to the exemplary embodiments.

The computer-readable storage medium 16 is configured to store computer-executable instructions or program codes, program data, and/or other suitable forms of information. A program 20 stored in the computer-readable storage medium 16 includes a set of instructions executable by the processor 14. In an embodiment, the computer-readable storage medium 16 may be a memory (a volatile memory such as a random access memory, a non-volatile memory, or any suitable combination thereof), one or more magnetic disk storage devices, optical disk storage devices, flash memory devices, other types of storage media that are accessible by the computing device 12 and store desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 via the input/output interface 22. The exemplary input/output device 24 may include a pointing device (a mouse, a trackpad, or the like), a keyboard, a touch input device (a touch pad, a touch screen, or the like), a voice or sound input device, input devices such as various types of sensor devices and/or imaging devices, and/or output devices such as a display device, a printer, a speaker, and/or a network card. The exemplary input/output device 24 may be included inside the computing device 12 as a component constituting the computing device 12, or may be connected to the computing device 12 as a separate device distinct from the computing device 12.

An embodiment of the present invention may include a program for executing the methods described herein on a computer and a computer-readable recording medium including the program. The computer-readable recording medium may include a program command, a local data file, and a local data structure, taken alone or in combination. The above medium may be specially designed for the present invention or may be commonly available in the technical field of computer software. Examples of the computer-readable recording medium include hardware devices specially configured to store and perform program commands, such as magnetic media such as hard disks, floppy disks, and magnetic tapes, optical media such as CD-ROMs and DVDs, ROMs, RAMs, and flash memories. Examples of the program may include not only machine codes such as those produced by a compiler but also high-level language codes that may be executed by a computer using an interpreter.

Although the representative embodiments of the present invention have been described in detail as above, those skilled in the art will understand that various modifications may be made thereto without departing from the scope of the present invention. Therefore, the scope of rights of the present invention should not be limited to the described embodiments, but should be defined not only by the claims set forth below but also by equivalents of the claims.

The invention claimed is:

1. An image segmentation model training apparatus comprising:
    a predictor, which generates a plurality of original masks using an unlabeled original image set and a pre-trained image segmentation model;
    a label generator, which generates a synthesized image set based on the original image set and the plurality of original masks, and generates a plurality of pseudo labels based on the synthesized image set;
    a pre-processor, which generates a training image set by performing pseudo labeling on the original image set and the synthesized image set using the plurality of pseudo labels; and
    a model trainer, which further trains the image segmentation model based on the training image set.

2. The apparatus of claim 1, wherein the label generator comprises:

a mask generator, which generates a plurality of modified masks based on at least one of the plurality of original masks;

a synthesizer, which generates the synthesized image set based on the original image set and the plurality of modified masks;

an estimator, which estimates a probability that each of synthesized images included in the synthesized image set is determined as an image included in the original image set; and a determinator, which determines, as the pseudo label, boundary information about a mask used to generate a synthesized image for which the probability is above a preset value among the plurality of modified masks.

3. The apparatus of claim 2, wherein the mask generator generates the plurality of modified masks by modifying the boundary information of at least one of the plurality of original masks.

4. The apparatus of claim 2, wherein the label generator further comprises an agent, which generates a matching pair of at least a portion of images included in the original image set and the plurality of modified masks and a synthesis parameter for generating the synthesized images; and the synthesizer generates the synthesized image set based on the matching pair and the synthesis parameter.

5. The apparatus of claim 1, wherein the pre-processor generates a first training image set by performing the pseudo labeling on the original image set using the plurality of pseudo labels, and generates a second training image set by performing the pseudo labeling on the synthesized image set using the plurality of pseudo labels.

6. The apparatus of claim 5, wherein the pre-processor performs the pseudo labeling on the original image set by displaying boundary information corresponding to one of the plurality of pseudo labels on at least one original image included in the original image set, and performs the pseudo labeling on the synthesized image set by displaying the boundary information corresponding to one of the plurality of pseudo labels on at least one synthesized image included in the synthesized image set.

7. The apparatus of claim 1, further comprising a training completer, which completes training of the image segmentation model when a number of the plurality of pseudo labels generated is above a preset value.

8. An image segmentation model training method performed in a computing device including one or more processors and a memory storing one or more programs executed by the one or more processors, the method comprising:

generating a plurality of original masks using an unlabeled original image set and a pre-trained image segmentation model;

generating a synthesized image set based on the original image set and the plurality of original masks;

generating a plurality of pseudo labels based on the synthesized image set;

generating a training image set by performing pseudo labeling on the original image set and the synthesized image set using the plurality of pseudo labels; and further training the image segmentation model based on the training image set.

9. The method of claim 8, wherein the generating of the synthesized image set comprises:

generating a plurality of modified masks based on at least one of the plurality of original masks; and generating the synthesized image set based on the original image set and the plurality of modified masks.

10. The method of claim 9, wherein the generating of the plurality of pseudo labels comprises:

estimating a probability that each of synthesized images included in the synthesized image set is determined as an image included in the original image set; and determining, as the pseudo label, boundary information about a mask used to generate a synthesized image for which the probability is above a preset value among the plurality of modified masks.

11. The method of claim 9, wherein the generating of the plurality of modified masks comprises generating the plurality of modified masks by modifying the boundary information of at least one of the plurality of original masks.

12. The method of claim 10, wherein the generating of the plurality of pseudo labels further comprises generating a matching pair of at least a portion of images included in the original image set and the plurality of modified masks and a synthesis parameter for generating the synthesized images; and the generating of the synthesized image set comprises generating the synthesized image set based on the matching pair and the synthesis parameter.

13. The method of claim 8, wherein the generating of the training image set comprises:

generating a first training image set by performing the pseudo labeling on the original image set using the plurality of pseudo labels; and generating a second training image set by performing the pseudo labeling on the synthesized image set using the plurality of pseudo labels.

14. The method of claim 13, wherein the generating of the training image set comprises:

performing the pseudo labeling on the original image set by displaying the boundary information corresponding to one of the plurality of pseudo labels on at least one original image included in the original image set; and performing the pseudo labeling on the synthesized image set by displaying the boundary information corresponding to one of the plurality of pseudo labels on at least one synthesized image included in the synthesized image set.

15. The method of claim 8, further comprising completing training of the image segmentation model when a number of the plurality of pseudo labels generated is above a preset value.

* * * * *